(12) United States Patent
Dong et al.

(10) Patent No.: US 10,168,834 B2
(45) Date of Patent: Jan. 1, 2019

(54) METHOD AND DEVICE FOR OPERATING A TOUCH SCREEN

(71) Applicant: ZTE Corporation, Shenzhen (CN)

(72) Inventors: Shufang Dong, Shenzhen (CN); Gonghong Xiang, Shenzhen (CN); Haijing Guo, Shenzhen (CN)

(73) Assignee: XI'AN ZHONGXING NEW SOFTWARE CO., LTD., Xi'An (CN)

( * ) Notice: Subject to any disclaimer, the term of this patent is extended or adjusted under 35 U.S.C. 154(b) by 0 days.

(21) Appl. No.: 15/514,985

(22) PCT Filed: May 29, 2015

(86) PCT No.: PCT/CN2015/080171
§ 371 (c)(1),
(2) Date: Mar. 28, 2017

(87) PCT Pub. No.: WO2016/045401
PCT Pub. Date: Mar. 31, 2016

(65) Prior Publication Data
US 2017/0228102 A1    Aug. 10, 2017

(30) Foreign Application Priority Data
Sep. 28, 2014 (CN) .......................... 2014 1 0510094

(51) Int. Cl.
*G06F 3/041* (2006.01)
*G06F 3/0488* (2013.01)

(52) U.S. Cl.
CPC ........ *G06F 3/0418* (2013.01); *G06F 3/04883* (2013.01)

(58) Field of Classification Search
None
See application file for complete search history.

(56) References Cited

U.S. PATENT DOCUMENTS

2012/0072870 A1* 3/2012 Akifusa ................ G06F 3/0482
715/830
2012/0326984 A1* 12/2012 Ghassabian ........... G06F 3/0236
345/168

(Continued)

FOREIGN PATENT DOCUMENTS

CN    103116467 A    5/2013
CN    103399662 A    11/2013

(Continued)

OTHER PUBLICATIONS

International Search Report dated Aug. 26, 2015 re: Application No. PCT/CN2015/080171; pp. 1-3.

(Continued)

*Primary Examiner* — Matthew Yeung
(74) *Attorney, Agent, or Firm* — Cantor Colburn LLP

(57) ABSTRACT

Method and device for operating a touch screen are provided. The method includes that: a terminal obtains an actual sliding track of a touch operation of a user on a touch screen of the terminal (S102); the terminal replaces the actual sliding track with a pre-set sliding track corresponding to the actual sliding track (S104); and the terminal responds to a touch operation of the user according to the pre-set sliding track (S106). The present disclosure solves the problem in the prior art that a touch screen reports all false touches of a user over-sensitively and over-precisely, thereby facilitating a simple operation on the touch screen, reducing false and misinterpreted touches, and improving user experience.

8 Claims, 3 Drawing Sheets

(56) References Cited

U.S. PATENT DOCUMENTS

2013/0185628 A1\* 7/2013 Lira .................. G06F 3/0485
715/234
2014/0282231 A1 9/2014 Foreman et al.

FOREIGN PATENT DOCUMENTS

| CN | 103530045 A | 1/2014 |
| CN | 103605473 A | 2/2014 |
| EP | 2587358 A2 | 5/2013 |

OTHER PUBLICATIONS

Extended European Search Report dated Sep. 21, 2017 re: Application No. PCT/CN2015080171, pp. 1-8.

\* cited by examiner

METHOD AND DEVICE FOR OPERATING A TOUCH SCREEN

TECHNICAL FIELD

The present disclosure relates to the field of communications, and in particular to a method and device for operating a touch screen and device.

BACKGROUND

At present, terminals with touch screens have been widely used by people. The touch screen of the terminal is very sensitive, but most of the time a user just needs very simple operations like sliding up, sliding down, sliding left, sliding right, and clicking. The existing touch screen over-sensitively and precisely reports all touched points on the screen; sometimes, the over sensitivity makes the above simple operations become complex and chaotic.

Aiming at the problem in the prior art that a touch screen sensitively and precisely reports all false touches performed by the user, an effective solution has not been presented.

SUMMARY

The present disclosure provides a method and device for operating a touch screen, for at least solving the problem in the prior art that a touch screen reports all false touches of a user over-sensitively and over-precisely.

According to an embodiment of the present disclosure, a method for operating a touch screen is provided, which includes that: a terminal obtains an actual sliding track of a touch operation of a user on a touch screen of the terminal; the terminal replaces the actual sliding track with a pre-set sliding track corresponding to the actual sliding track; and the terminal responds to a touch operation of the user according to the pre-set sliding track.

In certain embodiments, before the terminal replaces the actual sliding track with the pre-set sliding track corresponding to the actual sliding track, the method further includes that: the terminal receives an operation instruction of the user; under the trigger of the operation instruction, the terminal opens a simple operation mode, wherein in the simple operation mode, the terminal replaces the actual sliding track with the pre-set sliding track corresponding to the actual sliding track.

In certain embodiments, the simple operation mode includes: a horizontal operation mode or a vertical operation mode; in the horizontal operation mode, the terminal replaces the actual vertical sliding track with the pre-set vertical sliding track corresponding to the actual vertical sliding track; in the vertical operation mode, the terminal replaces the actual horizontal sliding track with the pre-set horizontal sliding track corresponding to the actual horizontal sliding track.

In certain embodiments, the simple operation mode includes: an intelligent operation mode; the intelligent operation mode is determining that the touch screen enters the horizontal operation mode when a difference value between the number of horizontal operations on the touch screen and the number of vertical operations on the touch screen is greater than a first threshold in a predetermined period of time, or determining that the touch screen enters the vertical operation mode when the difference value between the number of vertical operations on the touch screen and the number of horizontal operations on the touch screen is greater than a second threshold in the predetermined period of time.

In certain embodiments, before the terminal opens the simple operation mode, the method includes that: the terminal detects the current running scenario, wherein when the running scenario satisfies a pre-set condition, the terminal triggers the opening of the simple operation mode.

In certain embodiments, the pre-set condition includes: it is detected that a specified application is running or stops running.

According to another embodiment of the present disclosure, a device for operating a touch screen is also provided, which is arranged in the terminal; the device includes: an obtaining module, which is configured to obtain the actual sliding track of a touch operation of a user on the touch screen of the terminal; a replacing module, which is configured to replace the actual sliding track with the pre-set sliding track corresponding to the actual sliding track; and a responding module, which is configured to respond to the touch operation of the user according to the pre-set sliding track.

In certain embodiments, the device further includes: a receiving module, which is configured to receive the operation instruction of the user; and an opening module, which is configured to, under the trigger of the operation instruction, open the simple operation mode; wherein in the simple operation mode, the replacing module is configured to replace the actual sliding track with the pre-set sliding track corresponding to the actual sliding track.

In certain embodiments, the simple operation mode includes: the horizontal operation mode or the vertical operation mode; in the horizontal operation mode, the replacing module is configured to replace the actual vertical sliding track with the pre-set vertical sliding track corresponding to the actual vertical sliding track; in the vertical operation mode, the replacing module is configured to replace the actual horizontal sliding track with the pre-set horizontal sliding track corresponding to the actual horizontal sliding track.

In certain embodiments, the simple operation mode includes: the intelligent operation mode; the intelligent operation mode is determining that the touch screen enters the horizontal operation mode when the difference value between the number of horizontal operations on the touch screen and the number of vertical operations on the touch screen is greater than the first threshold in the predetermined period of time, or determining that the touch screen enters the vertical operation mode when the difference value between the number of vertical operations on the touch screen and the number of horizontal operations on the touch screen is greater than the second threshold in the predetermined period of time.

In certain embodiments, the device further includes: a detecting module, which is configured to detect the current running scenario, wherein when the running scenario satisfies the pre-set condition, the opening module triggers the opening of the simple operation mode.

In certain embodiments, the pre-set condition includes: it is detected that the specified application is running or stops running.

In the provided methods and device for operating a touch screen, the terminal obtains the actual sliding track on the touch screen of the terminal of the user, replaces the actual sliding track with the pre-set sliding track corresponding to the actual sliding track, and responds to the touch operation of the user according to the pre-set sliding track. In such a manner, the problem in the prior art that the touch screen reports all false touches of the user over-sensitively and over-precisely is solved, thereby facilitating a simple operation on the touch screen, reducing false and misinterpreted touches, and improving the user experience.

BRIEF DESCRIPTION OF THE DRAWINGS

The accompanying drawings described here are used for providing a deeper understanding of the present disclosure, and constitute a part of the application; schematic embodiments of the present disclosure and description thereof are used for illustrating the present disclosure.

DETAILED DESCRIPTION OF THE EMBODIMENTS

The present disclosure is elaborated below with reference to the accompanying drawings and embodiments. Note that, the embodiments and the features in the embodiments of the application can be combined with each other under the condition of no conflicts.

Figure 1:
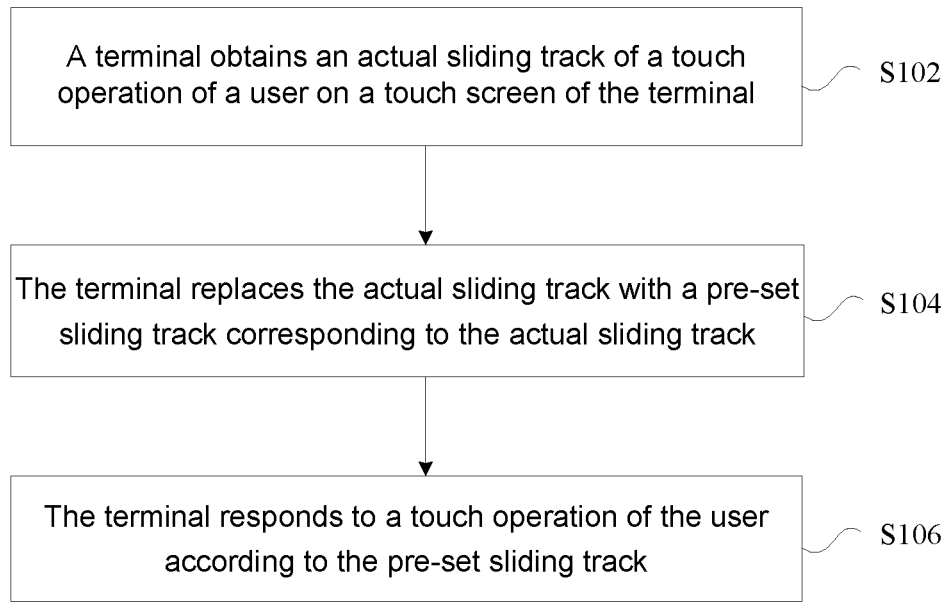
FIG. 1 shows a flowchart of a method for operating a touch screen according to an embodiment of the present disclosure.

The present embodiment provides a method for operating a touch screen. FIG. 1 shows a flowchart of a method for operating a touch screen according to an embodiment of the present disclosure. As shown in FIG. 1, the flow includes the following steps 102 to 106.

At Step 102: a terminal obtains an actual sliding track of a touch operation of a use on a touch screen of the terminal.

At Step 104: the terminal replaces the actual sliding track with a pre-set sliding track corresponding to the actual sliding track.

At Step 106: the terminal responds to a touch operation of the user according to the pre-set sliding track.

Through the above steps, the terminal replaces the obtained actual sliding track on the touch screen of the terminal of the user with the pre-set sliding track corresponding to the actual sliding track, so as to respond to the touch operation of the user according to the pre-set sliding track; that is, the terminal adjusts a display interface according to the pre-set sliding track; compared with the problem in the prior art that the touch screen reports all false touches of the user over-sensitively and over-precisely, the above steps can perform simple operation on the touch screen more conveniently, reduce false and misinterpreted touches, and improve user experience.

The implementation of the above steps needs to first open a simple operation mode of the touch screen of the terminal. In an exemplary embodiment, before replacing the actual sliding track with the pre-set sliding track corresponding to the actual sliding track, the terminal receives an operation instruction of the user, and opens a simple operation mode under the trigger of the operation instruction, wherein in the simple operation mode, the terminal replaces the actual sliding track with the pre-set sliding track corresponding to the actual sliding track. For example, a function of setting the simple operation mode of the touch screen is added in the terminal, and by touching a simple operation button, the terminal enters the simple operation mode.

In an exemplary embodiment, the simple operation mode includes: a horizontal operation mode or a vertical operation mode. In the horizontal operation mode, the terminal replaces the actual vertical sliding track with the pre-set vertical sliding track corresponding to the actual vertical sliding track. For example, the vertical coordinate under the current trigger is recorded, and before the next trigger, the vertical coordinate under the next trigger is replaced with the vertical coordinate recorded before, and the horizontal coordinate dynamically changes with the continuous trigger of the touch screen. In the vertical operation mode, the terminal replaces the actual horizontal sliding track with the pre-set horizontal sliding track corresponding to the actual horizontal sliding track. For example, the horizontal coordinate under the current trigger is recorded, and before the next trigger, the horizontal coordinate under the next trigger is replaced with the horizontal coordinate recorded before, and the vertical coordinate dynamically changes with the continuous trigger of the touch screen. So the users can flexibly the horizontal operation mode or the vertical operation mode to the touch screen.

After the user selects the simple operation mode, the user can further select the horizontal operation mode or the vertical operation mode in a submenu under the simple operation button. In another exemplary embodiment, the terminal can also intelligently select the horizontal operation mode or the vertical operation mode; the intelligent operation mode is determining that the touch screen enters the horizontal operation mode when a difference value between the number of horizontal operations on the touch screen and the number of vertical operations on the touch screen is greater than a first threshold in a predetermined period of time, or determining that the touch screen enters the vertical operation mode when the difference value between the number of vertical operations on the touch screen and the number of horizontal operations on the touch screen is greater than a second threshold in the predetermined period of time, which does not require the user to manually select the horizontal operation mode or the vertical operation mode, thereby the user experience.

In an exemplary embodiment, before opening the simple operation mode, the terminal detects the current running scenario, wherein when the running scenario satisfies a pre-set condition, the terminal triggers the opening of the simple operation mode. In another exemplary embodiment, the pre-set condition includes: it is detected that a specified application is running or stops running.

The present embodiment also provides a device for operating a touch screen. The device is used for implementing the above embodiments and exemplary implementations, which will not be elaborated herein. The term "module" used below can realize a combination of software and/or hardware with an intended function. Although the device described in the following embodiment is realized through software better, the realization through hardware or a combination of software and hardware is possible and conceived.

Figure 2:
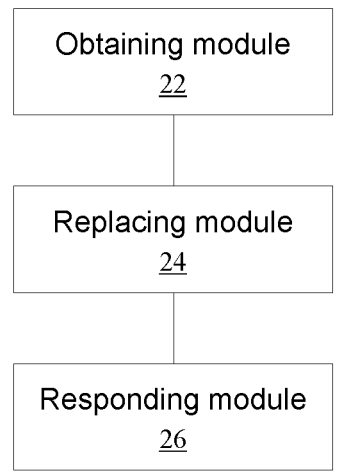
FIG. 2 shows a structure diagram of a device for operating a touch screen according to an embodiment of the present disclosure.

FIG. 2 shows a structure diagram of a device for operating a touch screen according to an embodiment of the present disclosure. The device is arranged in the terminal. As shown in FIG. 2, the device includes: an obtaining module 22, which is configured to obtain the actual sliding track of the touch operation of the user on the touch screen of the terminal of the user; a replacing module 24, which is configured to replace the actual sliding track with the pre-set sliding track corresponding to the actual sliding track; and a responding module 26, which is configured to respond to the touch operation of the user according to the pre-set sliding track.

Figure 3:
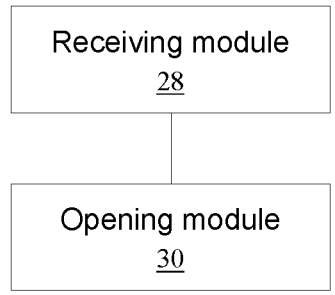
FIG. 3 shows a structure diagram 1 of a device for operating a touch screen according to an embodiment of the present disclosure.

FIG. 3 shows a structure diagram 1 of a device for operating a touch screen according to an embodiment of the present disclosure. As shown in FIG. 3, the device further includes: a receiving module 28, which is configured to receive the operation instruction of the user; and an opening module 30, which is configured to, under the trigger of the operation instruction, open the simple operation mode; wherein in the simple operation mode, the replacing module 24 is configured to replace the actual sliding track with the pre-set sliding track corresponding to the actual sliding track.

In certain embodiments, the simple operation mode includes: the horizontal operation mode or the vertical operation mode; in the horizontal operation mode, the replacing module 24 is configured to replace the actual vertical sliding track with the pre-set vertical sliding track corresponding to the actual vertical sliding track; in the vertical operation mode, the replacing module 24 is configured to replace the actual horizontal sliding track with the pre-set horizontal sliding track corresponding to the actual horizontal sliding track.

In certain embodiments, the simple operation mode includes: the intelligent operation mode; the intelligent operation mode is determining that the touch screen enters the horizontal operation mode when the difference value between the number of horizontal operations on the touch screen and the number of vertical operations on the touch screen is greater than the first threshold in the predetermined period of time, or determining that the touch screen enters the vertical operation mode when the difference value between the number of vertical operations on the touch screen and the number of horizontal operations on the touch screen is greater than the second threshold in the predetermined period of time.

Figure 4:
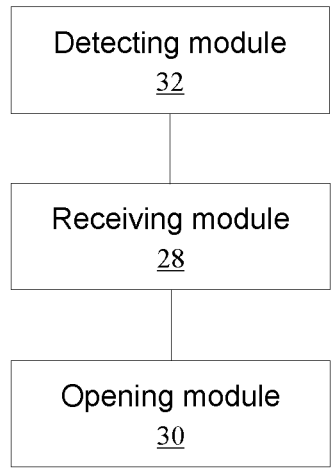
FIG. 4 shows a structure diagram 2 of a device for operating a touch screen according to an embodiment of the present disclosure.

FIG. 4 shows a structure diagram 2 of a device for operating a touch screen according to an embodiment of the present disclosure. As shown in FIG. 4, the device further includes: a detecting module 32, which is configured to detect the current running scenario, wherein when the running scenario satisfies the pre-set condition, the opening module triggers the opening of the simple operation mode.

In the embodiment of the present disclosure, the pre-set condition includes: it is detected that the specified application is running or stops running.

Aiming at the problem in the prior art, an elaboration is given below in combination with the exemplary embodiment, wherein the present exemplary embodiment combines the above exemplary embodiment and its exemplary implementation mode. In the exemplary embodiment, the simple operation mode of the touch screen is used for the operations, like sliding up, sliding down, sliding left, sliding right, and clicking, that the user just wants to use; after the mode is opened, points on the X axis and the Y axis are fixed, so that the touch track can only move on the fixed axis. The present exemplary embodiment has the following main characteristics: the mode can be opened or closed by a specific operation, so the operation is simple and convenient; a sliding mode can be set freely or judged intelligently, which is efficient and simple; the original high sensitive touch screen can fast switch to the simple operation mode; and the application and scenario needed to be simplified can be specified.

Figure 5:
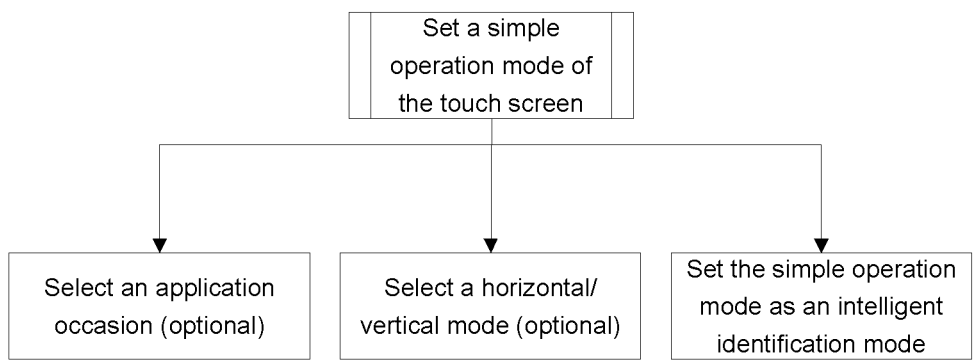
FIG. 5 shows a structure diagram of touch screen operating steps according to an embodiment of the present disclosure.

FIG. 5 shows a structure diagram of touch screen operating steps according to an embodiment of the present disclosure. As shown in FIG. 5, the specific implementation steps of the present exemplary embodiment include: opening the simple operation mode of the touch screen by operating; judging a use occasion, and whether to enter the simple operation mode (optional); if the simple operation mode is the horizontal mode, recording the vertical coordinate of sliding down, and replacing the actual vertical coordinate with the recorded vertical coordinate when moving a reported point, so as to realize horizontal movement; if the simple operation mode is the vertical mode, recording the horizontal coordinate of sliding down, and replacing the actual horizontal coordinate with the recorded horizontal coordinate when moving a reported point, so as to realize vertical movement; if the simple operation mode is the intelligent mode, recording the horizontal and vertical coordinates of sliding down, taking some points to judge whether the current operation is in the horizontal mode or vertical mode, and then replacing the actual coordinates to be reported; maintain the original states of the operations like clicking and long-pressing; and closing the simple operation mode of the touch screen, and no longer monitoring and modifying the reported point.

The present exemplary embodiment is elaborated below in combination with the accompanying drawings.

In the present exemplary embodiment, it is needed to add a function of setting the simple operation mode of the touch screen in a mobile phone, at the same time, the control of application occasion may be added. When the function is not enabled, all points received by the touch screen are not processed; once the function of simple operation mode is enabled, the touch points are monitored; once a Down event is received, and the application scenario is completely matched, coordinate points of X axis and Y axis are recorded; for a Move event generated after that, first the coordinate points to be reported are obtained, and then they are reported after being replaced with the recorded coordinate points of the X axis or the Y axis; after the function of simple operation mode is disabled, monitoring is stopped.

Figure 6:
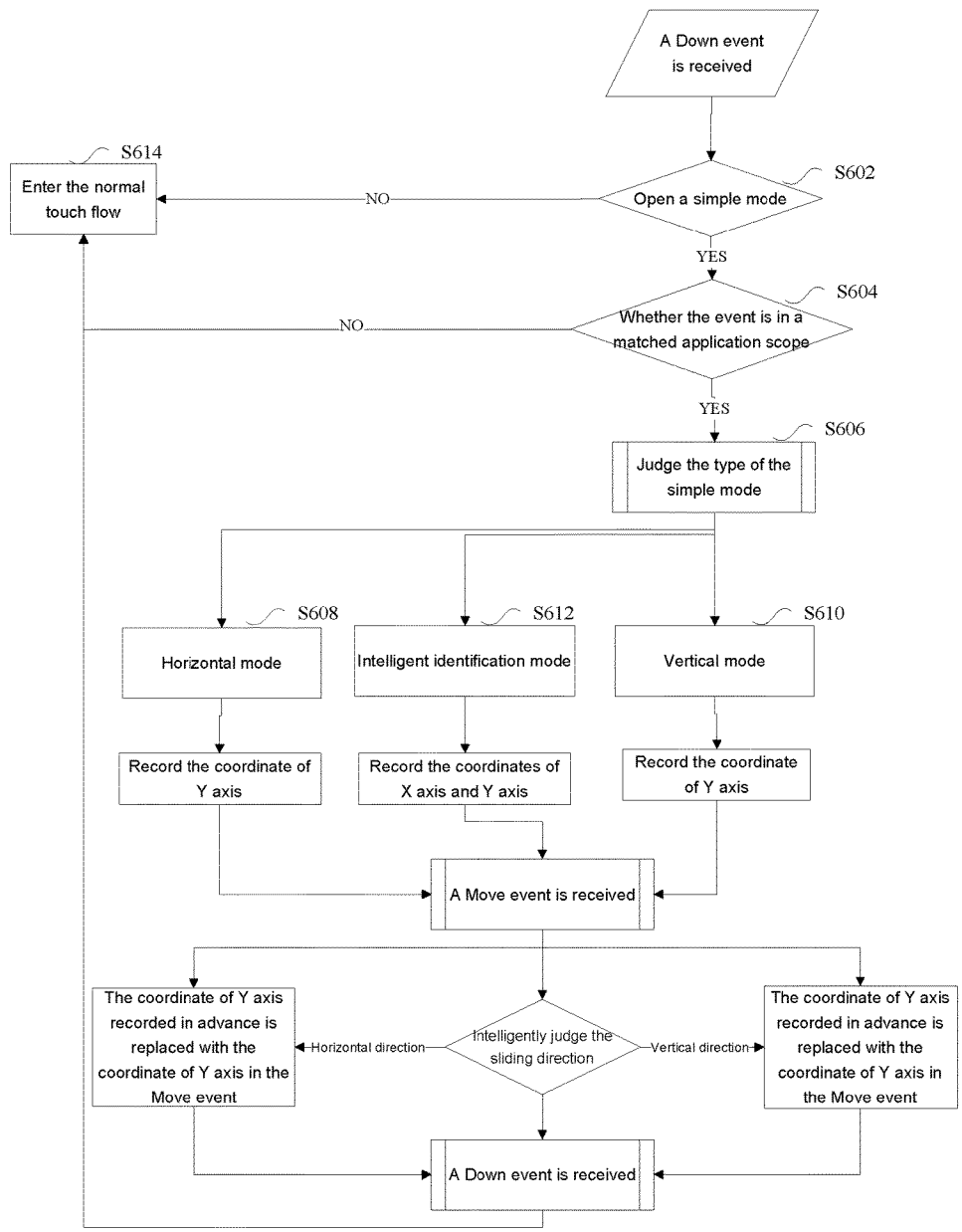
FIG. 6 shows a flowchart of a call transfer solution according to an embodiment of the present disclosure.

FIG. 6 shows a flowchart of a call transfer solution according to an embodiment of the present disclosure. As shown in FIG. 6, the flow includes the following steps 602 to 614.

At Step 602: it is judged whether the current operation mode is the simple operation mode (namely the simple mode); if so, perform Step 604; or else, perform Step 614.

At Step 604: after the Down event is received, it is judged whether the event is in a matched application scope (that is, it is judged whether the occasion needs monitoring); if so, turn to Step 606; or else, turn to Step 614.

At Step 606: the type of the simple mode required currently is judged; if it is the horizontal mode, turn to Step 608; if it is the vertical mode, turn to Step 610; if it is the intelligent identification mode, turn to Step 612.

At Step 608: the coordinate point of Y axis in the current Down state is recorded; when the Move event comes, the coordinate point of Y axis in the Move event is replaced with the coordinate point of Y axis in the record.

At Step 610: the coordinate point of X axis in the current Down state is recorded; when the Move event comes, the coordinate point of X axis in the Move event is replaced with the coordinate point of X axis in the record.

At Step 612: the coordinate points of X axis and Y axis in the current Down state are recorded; some points reported after that are taken to judge whether the next operation is a horizontal operation or a vertical operation; if it is the horizontal operation, turn to Step 608; if it is the vertical operation, turn to Step 610.

At Step 614: enter the normal touch screen flow.

The method for simply operating the touch screen provided by the embodiment of the present disclosure is not limited to single application, is simple to operate, and does not generate the annoying problems of false touches and false point reporting; besides, the mode can be dynamically and freely opened or closed, so a new experience of using the touch screen is created.

Obviously, those skilled in the art should appreciate that the above modules and steps of the present disclosure can be implemented by a general-purpose computing device, and they can be centralized in a single computing device or distributed on a network composed of multiple computing devices; optionally, they can be implemented by a program code which is capable of being executed by the computing device, so that they can be stored in a storage device and executed by the computing device; and in some cases, the presented or described steps can be executed in an order different from that described here; or they are made into integrated circuit modules, respectively; or multiple modules and steps of them are made into a single integrated circuit module to realize. In this way, the present disclosure is not limited to any particular combination of hardware and software.

The above is only the exemplary embodiments of the present disclosure and not intended to limit the present disclosure; for those skilled in the art, the present disclosure may have various modifications and changes. Any modifications, equivalent replacements, improvements and the like shall fall within the scope of protection of the present disclosure.

INDUSTRIAL APPLICABILITY

In the technical solutions provided by the present disclosure, the terminal obtains the actual sliding track of the touch operation on the touch screen of the terminal, replaces the actual sliding track with the pre-set sliding track corresponding to the actual sliding track, and responds to the touch operation of the user according to the pre-set sliding track. In such a manner, the problem in the prior art that the touch screen reports all false touches of the user over-sensitively and over-precisely is solved, thereby facilitating a simple operation on the touch screen, reducing false and misinterpreted touches, and improving the user experience.

What is claimed is:

1. A method for operating a touch screen, comprising:
    obtaining, by a terminal, an actual sliding track of a touch operation of a user on a touch screen of the terminal;
    replacing, by the terminal, the actual sliding track with a pre-set sliding track corresponding to the actual sliding track; and
    responding to, by the terminal, the touch operation of the user according to the pre-set sliding track;
    wherein before replacing, by the terminal, the actual sliding track with the pre-set sliding track corresponding to the actual sliding track, further comprising:
    receiving, by the terminal, an operation instruction of the user; and opening, by the terminal, a simple operation mode in responsive to the operation instruction, wherein in the simple operation mode, the terminal replaces the actual sliding track with the pre-set sliding track corresponding to the actual sliding track;
    wherein the simple operation mode comprises an intelligent operation mode; wherein the intelligent operation mode is that: determining that the touch screen enters a horizontal operation mode when a difference value between the number of horizontal operations on the touch screen and the number of vertical operations on the touch screen is greater than a first threshold in a predetermined period of time, or determining that the touch screen enters a vertical operation mode when the difference value between the number of vertical operations on the touch screen and the number of horizontal operations on the touch screen is greater than a second threshold in the predetermined period of time.

2. The method according to claim 1, wherein the simple operation mode comprises the horizontal operation mode or the vertical operation mode;
    in the horizontal operation mode, the terminal replaces an actual vertical sliding track with a pre-set vertical sliding track corresponding to the actual vertical sliding track; in the vertical operation mode, the terminal replaces an actual horizontal sliding track with a pre-set horizontal sliding track corresponding to the actual horizontal sliding track.

3. The method according to claim 2, before opening, by the terminal, the simple operation mode, further comprising:
    detecting, by the terminal, a current running scenario, and when the running scenario satisfies a pre-set condition, the terminal triggers the opening of the simple operation mode.

4. The method according to claim 3, wherein the pre-set condition comprises: it is detected that a specified application is running or stops running.

5. A device for operating a touch screen, which is arranged in a terminal, comprising:
    an obtaining module, which is configured to obtain an actual sliding track of a touch operation of a user on a touch screen of the terminal;
    a replacing module, which is configured to replace the actual sliding track with a pre-set sliding track corresponding to the actual sliding track; and
    a responding module, which is configured to respond to a touch operation of the user according to the pre-set sliding track;
    a receiving module, which is configured to receive an operation instruction of the user;
    an opening module, which is configured to, open a simple operation mode in responsive to the operation instruction, wherein in the simple operation mode, the replacing module is configured to replace the actual sliding track with the pre-set sliding track corresponding to the actual sliding track;
    wherein the simple operation mode comprises an intelligent operation mode; wherein the intelligent operation mode is that: it is determined that the touch screen enters a horizontal operation mode when a difference value between the number of horizontal operations on the touch screen and the number of vertical operations on the touch screen is greater than a first threshold in a predetermined period of time, or it is determined that the touch screen enters a vertical operation mode when the difference value between the number of vertical operations on the touch screen and the number of horizontal operations on the touch screen is greater than a second threshold in the predetermined period of time.

6. The device according to claim 5, wherein the simple operation mode comprises the horizontal operation mode or the vertical operation mode;

in the horizontal operation mode, the replacing module is configured to replace an actual vertical sliding track with a pre-set vertical sliding track corresponding to the actual vertical sliding track; in the vertical operation mode, the replacing module is configured to replace an actual horizontal sliding track with a pre-set horizontal sliding track corresponding to the actual horizontal sliding track.

7. The device according to claim 6, further comprising:

a detecting module, which is configured to detect a current running scenario, when the running scenario satisfies a pre-set condition, the opening module triggers the opening of the simple operation mode.

8. The device according to claim 7, wherein the pre-set condition comprises: it is detected that a specified application is running or stops running.

* * * * *